US012317076B2

United States Patent
Nainar et al.

(10) Patent No.: US 12,317,076 B2
(45) Date of Patent: May 27, 2025

(54) AUTHENTICATED SECURE AUDIO CALLING AND DIGITALLY SIGNED METADATA FOR INTEGRITY VERIFICATION

(71) Applicant: Cisco Technology, Inc., San Jose, CA (US)

(72) Inventors: Nagendra Kumar Nainar, Morrisville, NC (US); David John Zacks, Vancouver (CA); Vinay Saini, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 148 days.

(21) Appl. No.: 18/139,244

(22) Filed: Apr. 25, 2023

(65) Prior Publication Data

US 2024/0365118 A1 Oct. 31, 2024

(51) Int. Cl.
*H04L 29/06* (2006.01)
*H04L 9/32* (2006.01)
*H04M 3/42* (2006.01)
*H04W 12/065* (2021.01)

(52) U.S. Cl.
CPC ......... *H04W 12/065* (2021.01); *H04L 9/3213* (2013.01); *H04M 3/42034* (2013.01)

(58) Field of Classification Search
CPC .............. H04W 12/065; H04L 9/3213; H04M 3/42034
See application file for complete search history.

(56) References Cited

U.S. PATENT DOCUMENTS

| | | | | |
|---|---|---|---|---|
| 9,191,817 B1* | 11/2015 | Paczkowski | ........ | H04L 63/0876 |
| 9,277,049 B1* | 3/2016 | Danis | ...................... | H04M 3/54 |
| 12,143,531 B2* | 11/2024 | Douglas | .............. | H04M 3/2281 |
| 2007/0283142 A1 | 12/2007 | Milstein et al. | | |
| 2013/0232335 A1* | 9/2013 | King | ................. | H04W 12/0431 |
| | | | | 713/168 |
| 2016/0162900 A1* | 6/2016 | Dutt | ...................... | G06Q 50/01 |
| | | | | 705/44 |
| 2017/0142096 A1* | 5/2017 | Reddy | ................ | H04L 12/1827 |
| 2018/0183925 A1 | 6/2018 | Gallo | | |
| 2018/0241879 A1* | 8/2018 | Badger | ................ | H04M 3/493 |

(Continued)

FOREIGN PATENT DOCUMENTS

WO WO2011146533 11/2011

OTHER PUBLICATIONS

Patel et al., "Continuous User Authentication on Mobile Devices: Recent progress and remaining challenges", IEEE Signal Processing Magazine, vol. 33, Issue: 4, Jul. 2016.*

*Primary Examiner* — Morshed Mehedi
(74) *Attorney, Agent, or Firm* — Lee & Hayes, P.C.

(57) ABSTRACT

Techniques are described for providing secure audio calls between a calling party and a receiving party. Upon receiving a call request from a call initiating party, a notification is sent to the intended call recipient. The call recipient can send a request for a secure call. Upon receiving the request for a secure call, a bi-directional multifactor authentication is performed to authenticate the identity of both the call initiating party and the call receiving party. In response to successfully authenticating both parties, a secure call between the parties is established. One or more secure key tokens or other metadata can be embedded in the call to ensure security of the call.

21 Claims, 8 Drawing Sheets

(56) References Cited

U.S. PATENT DOCUMENTS

| | | |
|---|---|---|
| 2020/0034521 A1 | 1/2020 | Teng et al. |
| 2020/0336314 A1* | 10/2020 | Barakat ................. H04L 9/3247 |
| 2022/0086139 A1 | 3/2022 | Venkatesh et al. |
| 2023/0088868 A1* | 3/2023 | Haltom ............... H04L 65/1104 |
| | | 370/352 |
| 2023/0353569 A1* | 11/2023 | Zuo ........................ G06F 21/44 |

* cited by examiner

AUTHENTICATED SECURE AUDIO CALLING AND DIGITALLY SIGNED METADATA FOR INTEGRITY VERIFICATION

TECHNICAL FIELD

The present disclosure relates generally to telephonic security and more particularly to verification and authentication of the identity of parties to an audio phone call.

BACKGROUND

Data security is one of the essential services that is currently spanning across different industries for different types of applications and services. For example, digitally signing documents with a plethora of agreements is becoming a common and important concept that is resulting innovation. The concept of digitally signing a document can help to avoid spoofing or even to maintain the integrity of the original author by invalidating the integrity of a tampered document. Any malicious user trying to change the text or context of the document will have difficulty as any changes will invalidate the digital signature.

Phishing is a form of social engineering where attackers deceive people into revealing sensitive information or into installing malware such as ransomware. Phishing attacks have become increasingly sophisticated and often transparently mirror the site being targeted, allowing the attacker to observe everything while the victim is navigating the site, and breach any additional security boundaries with the victim. Phishing has become one of the most common types of cybercrime, and there are generally more incidents of phishing than any other type of computer crime. The term is a version of the work "fishing" and refers to the use of lures to "fish" for sensitive information. Measures to prevent or reduce the impact of phishing attacks include legislation, user education, public awareness, and technical security measures. The importance of phishing awareness has increased in both personal and professional settings, with the phishing attacks among businesses rising in the past years.

Phishing attacks, often delivered via email spam, attempt to trick individuals into giving away sensitive information or login credentials. Most attacks are bulk attacks that are not targeted and are instead sent in bulk to a wide audience. The goal of the attacker can vary, with common targets including financial institutions, email and cloud productivity providers, and streaming services. The stolen information or access may be used to steal money, install malware, or spear phish others within the target organization. Compromised streaming service accounts may also be sold on darknet markets.

Spear phishing is a targeted phishing attack that uses personalized emails to trick a specific individual or organization into believing that they are legitimate. It often utilizes personal information about the target to increase the chances of success. These attacks often target executives or those in financial departments with access to sensitive financial data and services. Accountancy and audit firms are particularly vulnerable to spear phishing due to the value of the information their employees have access to.

Whaling attacks use spear phishing techniques to target senior executives and other high-profile individuals with customized content, often related to a subpoena or customer complaint. CEO fraud involves sending fake emails from senior executives to trick employees into sending money to an offshore account. It has a low success rate but can result in organizations losing large sums of money.

Clone phishing is a type of attack in which a legitimate email with an attachment or link is copied and modified to contain malicious content. The modified email is then sent from a fake address made to look like it is from the original sender. The attack may appear to be a resend or update of the original email. It often relies on the sender or recipient being previously hacked so that the attacker can access the legitimate email.

SMS phishing or "smisching" is a type of phishing attack that uses text messages form a cell phone or smartphone to deliver a bait message. The victim is usually asked to click a link, call a phone number, or contact an email address provided by the attacker. They may then be asked to provide private information, such as login credentials for other websites. The difficulty in identifying illegitimate links can be compounded on mobile devices due to the limited display of URLs in mobile browsers. Smishing can be just as effective as email phishing, as many smartphones have fast internet connectivity. Smishing messages may also come from unusual phone numbers.

The proliferation of security threats such as phishing has arisen with the rise of the Internet, email, and networked communication due to the ease of communication that they provide and the ability to anonymously contact many users. However, these issues are not limited to these means of networked communication as security issues are potentially possible with voice or audio communication, which is becoming a possible problem related to various scams. Voice over IP (VOIP) can be used in "vishing" or "voice phishing" attacks, where attackers make automated phone calls to large numbers of people, often using text-to-speech synthesizers, claiming fraudulent activity to a person's accounts. The attackers spoof the calling phone number to appear as if it is coming from a legitimate person or institution. The victim is then prompted to enter sensitive information or connected to a live person who uses social engineering tactics to obtain information. Vishing takes advantage of the public's lower awareness and trust in voice telephony compared to email phishing.

In some instances, the calling party may even sound like a trusted party. For example, a malicious user may call any party multiple times to record various bits of audio messages. These audio fragments can be used to generate a spoof phone call that sounds legitimate and can even sound like the voice of a trusted caller. More specifically, messages such as "yes", "I agree", or "sure" can be recorded from a typical phone call, such as by asking a called parties name, such as from calling a trusted business such as a bank. These recorded bits can be used to create a fake audio recording.

In this case, even actual voice recognition cannot help in preventing such a scam, since the audio is in a trusted party's actual voice even though the generated call is from an unscrupulous scammer. Presently no system or process exists for addressing such security concerns with regard to telephonic audio communication.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
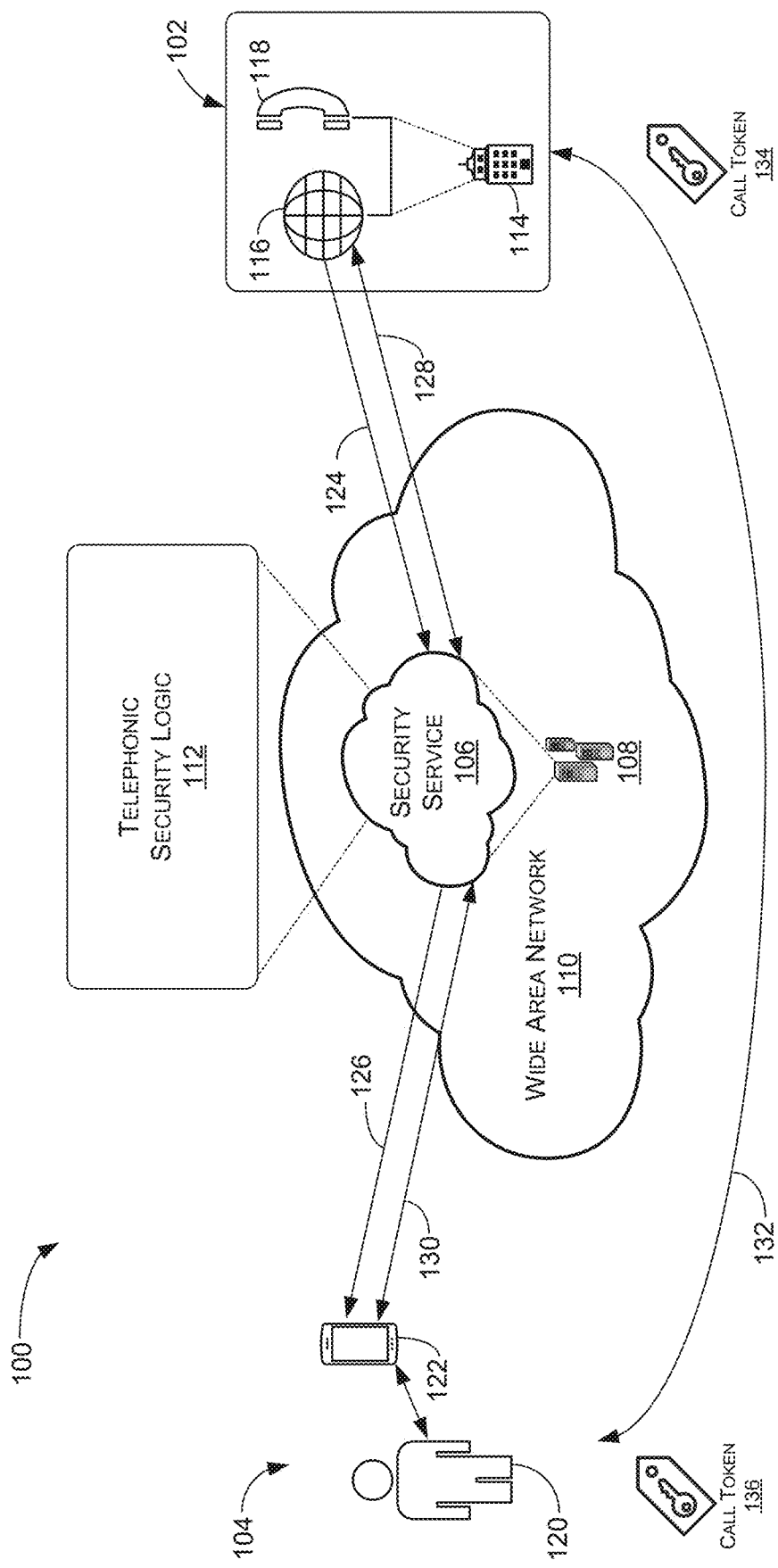
FIG. 1 illustrates a computer networking environment employing a remote, cloud-based telephonic security service for ensuring secure, authenticated telephonic communication between a calling party and a receiving party.

This disclosure describes techniques for providing secure, authenticated communication between a calling party and a receiving party. A call request is received from a calling party. A notification of the call request is sent to a receiving party for whom the calling party wishes to communicate. The receiving party can request authentication calling parties identity. This request for authentication can be automatic or set by default. Alternatively, request for authentication can be actively requested by the intended receiving party. A multi-factor authentication can then be performed to validate the identity of the calling party. The authentication can be a bi-directional authentication which not only authenticates the identity of the calling party, but also authenticates the identity of the receiving party. Upon successfully authenticating the identity of the party or parties, a secure telephonic call can be established between the calling party and the receiving party.

According to one embodiment, a recording of the secure call can be recorded and archived. A party requesting to access the archived recording can be authenticated to ensure that the party seeking to access the recording has authority to do so. For example, the authentication of the request for access to the archived recording of the call can be performed to authenticate that the party seeking access is one or both of the authenticated calling party and/or the authenticated receiving party.

Additionally, the techniques described herein may be performed by a system and/or device having non-transitory computer-readable media storing computer-executable instructions that, when executed by one or more processors, performs the method described above.

EXAMPLE EMBODIMENTS

The disclosure describes techniques for creating a cloud-based service that steers an audio call via the service to add bi-directional multifactor authentication of both a calling party and a receiving party to establish a secured call channel and to embed digital signature and other metadata for contextual awareness. The service can be implemented in partnership with a security service entity and a telecommunication entity such as a phone company.

When the calling party is initiating a call, they have the option to choose whether the call is to be a regular or secured call. Any secured call request will be steered over the security service to apply additional policies.

The call originator can include relevant originator info that includes details about the originator. In one embodiment, it can be simple originator specific information. In another embodiment, the originator information can be used to identify the specific caller within an organization with which the call originator is associated, such as a customer representative within a call center.

The security system will create the relevant metadata specific to a particular call session. It can be a simple unique token combined with the participant identification to differentiate the session, calling direction, etc. Alternatively, the token can also embed a time series that can be used to identify the specific message within a call. In short, the security service will assign a secure call token for the call session.

The call request can be forwarded to a client's mobile number or land line number. The client device will challenge the calling party to validate the integrity via the security service. The security service will perform single or multi-factor authentication and reply with the response. If the authentication fails, the call request will be terminated. If the authentication is successful, the affirmation will be forwarded to the client's phone. Alternatively, the security system can challenge the client to validate the integrity to ensure that the participant responding to the call is genuine. This can be either a default behavior or can include a way to signal it via the call request.

Upon successful bi-directional multifactor authentication via the security service, the secure call channel will be established. The security system will also exchange the unique token assigned to the call to both parties. Using continuous biometric authentication between the client device and the speaking party, the end user can be continuously authenticated. The entire call is exchanged with the metadata embedded that includes the unique token, calling-party-identification and called party identification. In addition to this, more relevant metadata can be added such as time, location, etc.

Any party recording the audio call will have the ability to use the embedded metadata to validate the integrity of the call at any time by simply checking with the security service. A timer may be associated with the token and/or the recorded audio call to invalidate the token and the audio file recording. More generally, the security service can be configured to introduce a cloud-based service that steers the audio call via the security service for bi-directional authentication to establish a secured call channel and to embed digital signature and other metadata for contextual awareness.

A cyber-security service such as Cisco Umbrella R can provide a cloud-based Secure Internet Gateway (SIG) platform that provides a user or enterprise with multiple levels of defense against internet-based threats. The security service can integrate secure web gateway, firewall, DNS-layer security, and cloud access security broker (CASB) functionality to protect an enterprise system against threats. The security service can be implemented by opening a browser, logging into the security service dashboard, registering a network by adding a network identity, and then pointing the DNS to the security service.

Depending upon the organization, the user may be required to inform service providers that network connection is being accessed through the security service of additional required IP address ranges. For example, some service providers may require prior knowledge of the IP address range used before allowing access to their services.

Several steps can be employed to access the security service. First, the user can register a network with the security service by adding a network identity. An identity is an entity that the security service protects through policies and monitors through reports. Second, the user can explicitly point its operating system or hardware firewall and router settings to the security service's name IP addresses and turn off the automatic DNS servers provided by the user's Internet Service Provider (ISP). In some embodiments, the security service can support both IPv4 and IPv6 addresses. Third, configuration policies can be added. Through policies, the user can define how the security service and access controls are applied to identities, determining whether traffic is inspected and either blocked or allowed. There are three policy types to consider adding. DNS policy provides DNS-layer visibility, security, and enforcement with the ability to selectively proxy risky domains for added security. Firewall policy provides filtering and forwarding of web traffic. Web policy provides URS-layer visibility, security, and enforcement of web traffic.

In some embodiments, each organization accessing the security service can be a separate instance of the security service and can have its own dashboard. Organizations can be identified by their account name and a unique organization identification (Org ID) number. The Org ID can be used to identify a particular organization when deploying component such as virtual appliances and is often requested by support teams to help identify the security service deployment. To access the security service a user can log into their unique security service dashboard. From the navigation menu, the user can expand its account name and confirm that they are logged into the correct security service dashboard. The organization name can be listed under its account name. Other organizations that the user has access to can be listed under "other organizations".

Not all features of the security service are necessarily available to all security service packages. An organization can select a licensing package that determines which security features are available to it as well as the level of support available to it. In some embodiments, the security service can provide a unified point of configuration of the security service DNS-layer security, cloud-delivered firewall (CDFW), and secure web gateway (SWG). The security service's core policy types can be DNS, Web, and Firewall.

Network traffic can flow to the security service from networks, IPsec tunnels, network devices, and client connectors and forwarders. The security service can represent a network entity, user, or group and an identity in a security service policy. Security service policy settings apply to an identity and a destination.

When the security service receives a destination request from an identity, the security service applies the enabled DNS policies to the destination. If the security service DNS-layer security does not block the destination, the security service forwards web traffic to the cloud-delivered firewall and the secure web gateway. Upon receiving a DNS request, the security service matches an enabled DNS policy to an identity and destination. The DNS-layer security applies the action defined in the DNS policy. If a user enables a firewall policy, the security service forwards any requests allowed by the DNS-layer security to the cloud-delivered firewall. The security service's cloud-delivered firewall either filters the request or forwards the web traffic to the secure web gateway (SWG). If the user enables a web policy, the security service's secure web gateway evaluates web traffic and applies the actions defined in the web policy. Allowed traffic can egress through Network Address Translation (NAT).

The security DNS policy enables the configuration and access control settings of the DNS-layer security for an identity. The security service firewall policy enables the configuration and access control settings of the cloud-delivered firewall (CDFW). In the firewall policy, a user can add destinations (ports, protocols, and applications) and IPsec tunnels. The cloud-delivered firewall (CDFW) filters web traffic on non-standard ports and standard web ports. The Web policy describes the URL-layer visibility in the user's network and enables the configuration and access control settings of the secure web gateway (SWG). The secure web gateway provides full URL reporting, content control, malware scanning and evaluation by antivirus engines, full or selective SSL decryption, and app visibility.

The security service includes a services status that provides online, real-time status information about the security service platforms. A user can view the status of the security service components, services, APIs, and worldwide data centers. The user can learn about recent maintenance and service events. The security service status lists the state of the services and components for the security service platforms. In addition to providing the status of individual components, the security service platform displays the daily status of all services for a given time-period.

The security service, or cyber-security service, can operate in conjunction with an authentication service such as Cisco's DUO R, which can employ multifactor authentication of one or more parties who are registered with the security service. The authentication service can provide strong user authentication and device security hygiene check and visibility. This integrated solution provides security admins the ability to enforce consistent user and device-based access policy for VPN access and thereby reduces risk for data breaches and ensures that compliance requirements are met.

The authentication service is a cloud security platform that provides security at DNS layer. The authentication service identifies malicious domains, Ips, detects anomalies and predicts emerging threats. It can provide first line of defense against threats originating from the Internet and therefore protecting logins into the authentication service is critical to maintaining the integrity of the security infrastructure. The authentication service is integrated with the security service to provide strong user authentication, device security hygiene check and visibility thereby ensuring access to the authentication service is not compromised.

The authentication service can also integrate with online meeting and communication services such as WebEx R, offering a variety of methods for adding multi-factor authentication and flexible security policies to SSO logins. The authentication service layers strong authentication and flexible policy engine on top of on-line meeting service logins using the Security Assertion Markup Language (SAML) 2.0 authentication standard. The authentication service authenticates users using existing on-premises or cloud-based directory credentials and prompts for multi-factor authentication before permitting access to the on-line meeting and communication service.

Multifactor authentication (MFA) is an electronic authentication method in which a user is granted access to a website or application only after successfully presenting two or more pieces of evidence (or factors) to an authentication mechanism. Authentication factors can include: knowledge (something the person knows), possession (something the user has), and inherence (something the user is). MFA protects user data, which may include personal identification or financial assets, from being accessed by an unauthorized third party that may have been able to discover, for example, a single password. A third-party authenticator (TPA) application enables two-factor authentication, usually by showing a randomly generated and frequently changing code to use for authentication.

Authentication takes place when someone tries to log into a computer resource such as a network, device, or application. The resource requires the user to supply the identity by which the user is known to the resource, along with evidence of the authenticity of the user's claim to that identity. Simple authentication requires only one such piece of evidence (factor), typically a password. For additional security, the resource may require more than one such piece of evidence (factor). The use of multiple authentication factors to prove one's identity is based on the premise that an unauthorized actor is unlikely to be able to supply the factors required for access. If, in an authentication attempt, at least one of the components is missing or supplied incorrectly, the user's identity is not established with sufficient certainty and access to the asset being protected by multi-factor authentication then remains blocked.

FIG. 1 illustrates a remote, cloud-based computer network environment 100 for providing secure telephonic communication between a calling party 102 and a receiving party 104. A cloud-based security service 106 is provided. In one embodiment, the security service 106 can reside on one or more servers 108 within and connected with a Wide Area Network 110 such as the Internet.

In one embodiment, the Security Service 106 can provide a range of security service to various registered parties or institutions such as businesses, government institutions, banks, etc. As one aspect, the security service 106 includes Telephonic Security Logic 112 for providing secure telephonic communications between parties such as between the calling party 102 and receiving party 104.

In one embodiment, the calling party 102 can be associated with an enterprise 114, such as a business, bank, government entity, etc. The calling party 102 can establish a telephone call using a caller's user device such as a cell phone or land line phone 118. The call can be placed through a telecommunication service 116 such as a communication network 5G wireless network, etc.

The receiving party 104 can be a user environment that can include one or more human users 120 and can include one or more user devices 122 such as a cell phone, land-line phone, laptop computer, desktop computer, tablet, etc. Prior to establishing a call, the user 104 can register with the Security Service 106. This can include establishing an account that can include setting up a username and password with the Security Service 106. In some embodiments, the security service can collect other identifying information such as biometric data, personal information, etc. The registration with the Security Service 106 can include preferences of the user as well. For example, the user 104 can request that all calls received be authenticated before even being notified of the incoming call. Alternatively, the user can set a preference to be notified of an incoming call and then be given an option to request authentication of the call. The user 104 can also set a preference that, upon a call failing authentication, allows the user 104 to decide whether to accept or deny the call anyway.

In one embodiment, the calling party 102 can also register with the Security Service prior to making a call. The registration of the calling party 102 can include identifying information which could be used for later identification and authentication of the calling party. The registration of the calling party 102 can also include preferences for receiving calls from another party such as the receiving party 104 other another party. For example, the preferences could include a preference to have all incoming or outgoing calls authenticated or can include a preference to only have incoming or outgoing calls authenticated by request of the calling party 102.

In an implementation according to an embodiment, the calling party 102 sends a call to the receiving party 104. The call, represented by line 124 is directed to the Security Service 106, via the telecommunication service 116. In one embodiment, the Security Service 106 sends a notification of the call 126 to the receiving party 104. The Security Service 106 employs the Telephonic Security Logic 112 to perform a multifactor authentication 128 of the calling party 102. The multifactor authentication 128 of the calling party can be performed using two or more authentication factors to validate the identity of the calling party 102. In addition, the security service 106 can perform multifactor authentication 130 of the receiving party 104.

Upon successfully authenticating both the calling party 102 and the receiving party 104, a secure audio call 132 can be established. The Security Service 106 can embed digital signatures or other metadata such as in the form of one or more call token keys 134, 136 to establish and maintain the secure audio call 132 between the calling and receiving parties 102, 104. In one embodiment, the Security Service 106 generates a token key 134, 136 for each of the calling party 102 and receiving party 104. In one embodiment, the identities of each of the calling party 102, and receiving party 104 can be continuously authenticated throughout the duration of the secure call 132 in order to ensure continuous security of the call. In one embodiment, this continuous authentication of the call can include the use of continuous biometric data of either or both of the calling party 102 and receiving party 104. For example, the Security Service can use facial recognition, fingerprint, retina scan data, etc. which can be continuously received from a user device such as the user device 122 of the receiving party or user device (e.g., telephone 118) of the calling party 102. The security service, by employing the telephonic security logic 112 performs a bi-directional authentication of an audio call to establish a secured call channel and to embed digital signature and other metadata for context awareness.

Figure 2:
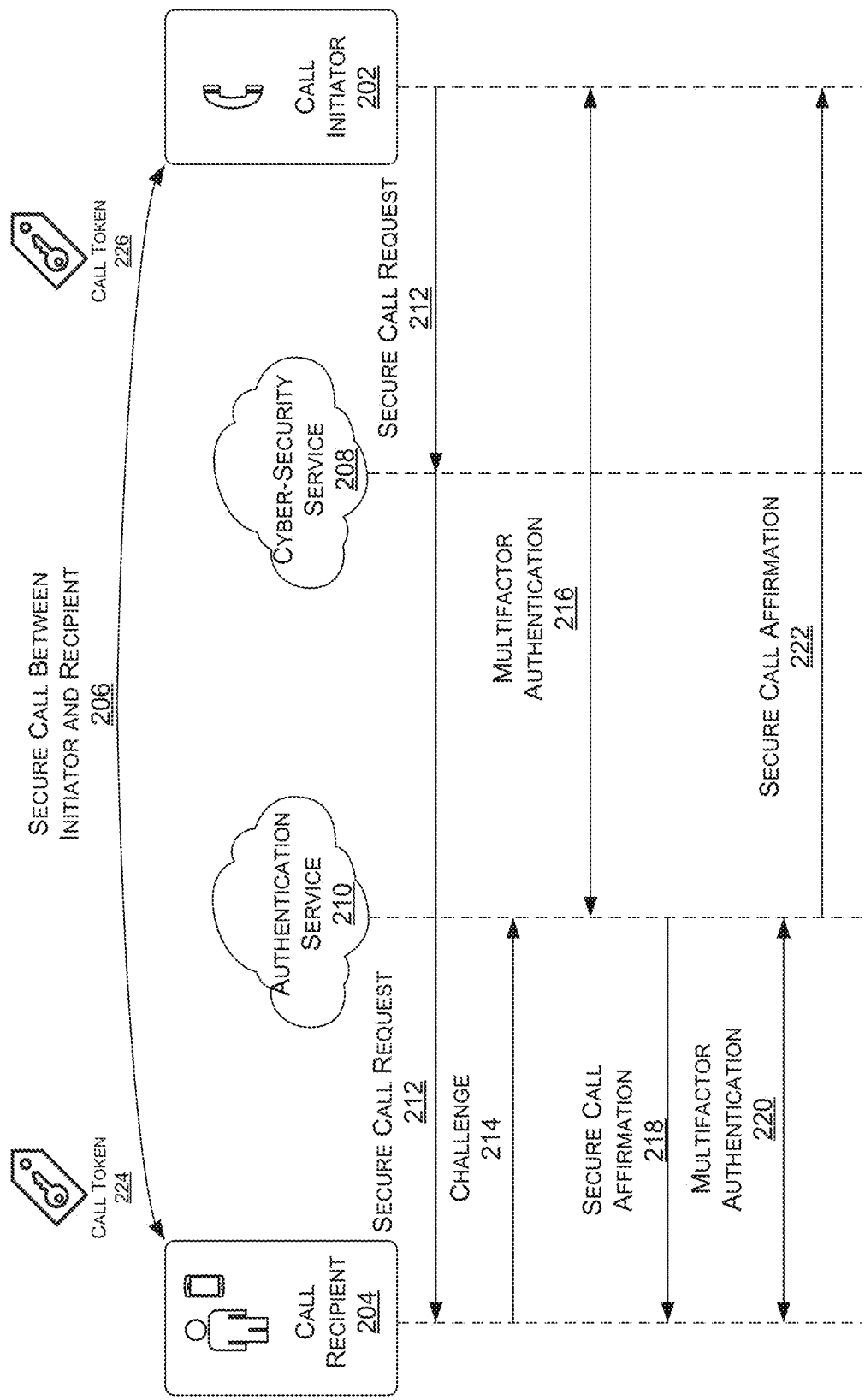
FIG. 2 illustrates a schematic representation of a system for providing secure validated telecommunication between a calling party and a receiving party.

FIG. 2 schematically illustrates a cloud-based system 200 for providing an exchange of information or data between a calling party or call initiator 202 and a receiving party or call recipient 204 in order to create a secure call 206 between the parties 202, 204. The system 206 according to an embodiment includes a cloud-based Cyber-Security Service 208 and a cloud-based Authentication Service 210. The Cyber-Security Service 208 can be a service such as Cisco Umbrella R. The Authentication Service 210 can be a service such as Cisco Duo R. The Cyber-Security Service 208 and the Authentication Service 210 can reside on one or more servers such as servers 108 described above in a Wide Area Network (WAN) such as the Internet, such as WAN 110 described above with reference to FIG. 1.

With continued reference to FIG. 2, the Call Initiator 202 sends a secure call request 212 to the Cyber-Security Service 208. In one embodiment, the Cyber-Security Service can forward a notification of the Secure Call Request 212 to the intended Call Recipient 204. The call request is notification to the Call Recipient 204 that the Call Initiator wishes to make a call and may include an option for the Call Recipient 204 to choose whether the Call Recipient would like the call to be a secure, authenticated call.

The Call Recipient 204 can issue a challenge 214 to the Authentication Service 210 indicating that the Call Recipient 204 would like to perform an authentication to initiate a secure audio call. In response to receiving the challenge 214, the Authentication Service 210 can perform a multifactor authentication 216 of the Call Initiator 202. The multifactor authentication 216 can include various authentication factors such as push notifications including a code, query question regarding previously stored information about the Call Initiator, biometric data, etc.

In response to successfully authenticating the identity of the Call Initiator 202, the Authentication Service 210 can send a Secure Call Affirmation notification 218 to the Call Recipient 204. In addition to authenticating the identity of the Call Initiator 202, the Authentication Service 210 can perform a Multifactor Authentication 220 of the Call Recipient 204 to verify that the Call Recipient 204 is in fact the party that the Call Initiator 202 Intended to call. The Multifactor Authentication 220 can include various authentication factors such as requiring the Call Recipient 204 to responds to push notifications with randomly selected codes, requiring the Call Recipient 204 to answer question regarding previously stored data, biometric data, etc. In response to authenticating the validity of the identity of the Call Recipient 204, a secure call affirmation notification 222 can be sent to the Call Initiator 202.

After authenticating both the identity of the Call Recipient 204 and Call Initiator 202, a secure call 206 can be established between the Call Recipient 204 and Call Initiator 202. The establishment of the secure call 206 can include embedding secure key tokens 224, 226 or other metadata into the secure call channel. In one embodiment, a unique secure key token 224, 226 or other metadata can be embedded for each of the Call Initiator 202 and Call Recipient 204.

Figure 3:
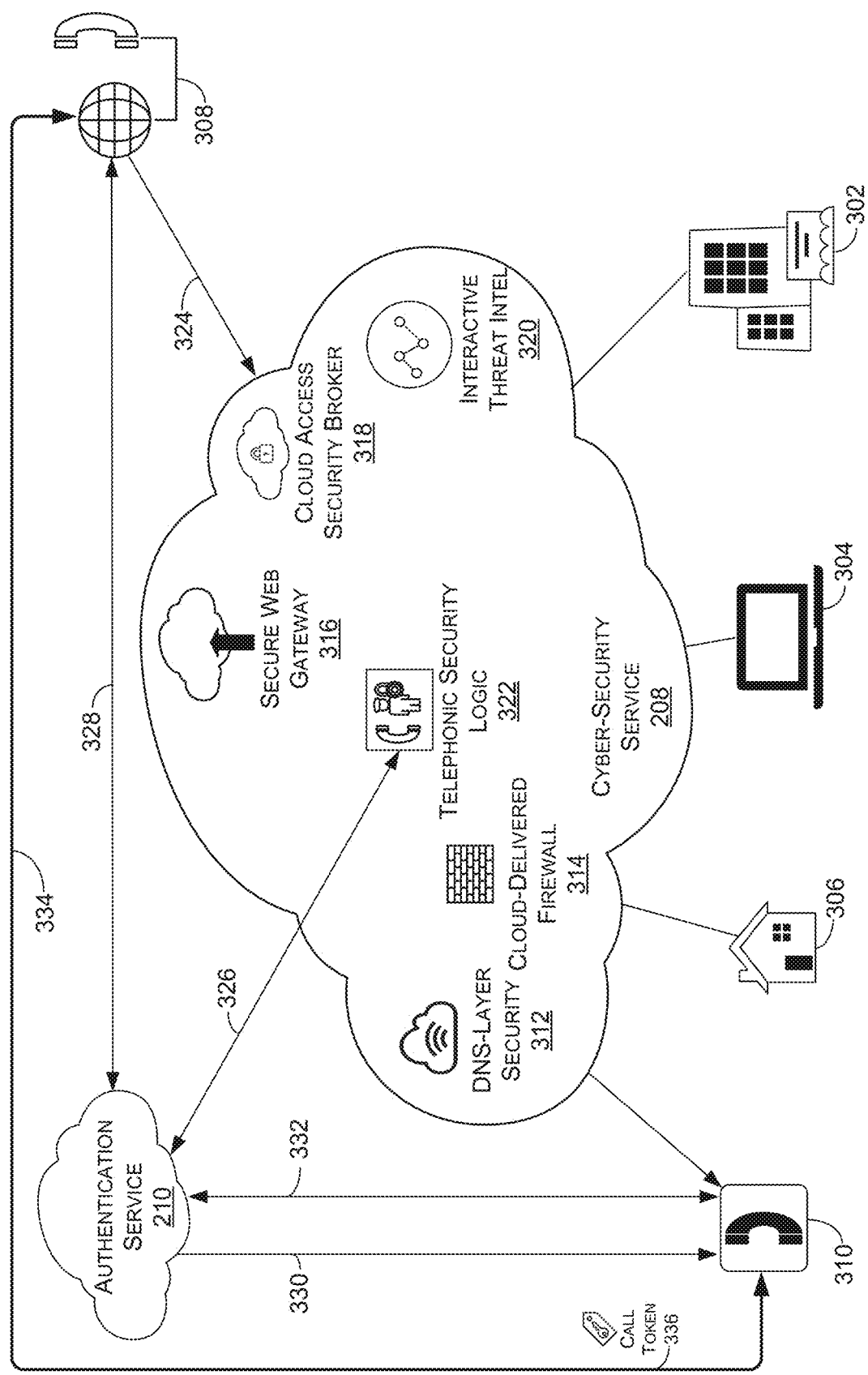
FIG. 3 illustrates a schematic description of a remote cloud-based security service which can be employed to provide secure telephonic communication between a calling party and a receiving party.

FIG. 3 is a schematic illustration of a cloud-based Authentication Service 210 and Cyber-Security Service 208 with the Cyber-Security Service 208 being shown in greater detail. As mentioned above, in one embodiment the Authentication Service 210 can be a cloud-based service similar to Cisco DUO R, and the Cyber-Security Service 208 can be a service similar to Cisco Umbrella R.

The Cyber-Security Service 208 is a cloud-based security service that can be implemented on one or more servers 108 residing in a Wide Area Network 110 such as the Internet, the servers 108 and network 110 having been previously described above with reference to FIG. 1. With continued reference to FIG. 3, various entities can register with the Cyber-Security Service 208. Example entities can include a business or government entity 302, a mobile computing device such a laptop or tablet 304, a home or remote office 306, etc. In addition, a Call Initiating party 308 and Call recipient 310 can be registered with the Cyber-Security Service 208. The Call Initiating party 308 and Call recipient 310 can be associated with an enterprise such as the variously described entities 302, 304, 306.

The Cyber-Security Service 208 can be a service that provides many different security services in addition to audio call authentication. For example, in some embodiments, the Cyber-Security Service 208 can include Domain Name Server (DNS)-Layer Security services 312. Domain Name Servers (DNS) are at the heart of connecting internet requests. Securing the DNS layer means blocking malicious domains, IP addresses, and cloud applications before a connection is established. The Cyber-Security Service 208 can also provide Cloud-Delivered Firewall services 314. The Cyber-Security Service 208 can also provide Secure Web Gateway services 316, Cloud Access Security Broker services 318, and Interactive Threat Intelligence information 320.

Cyber Security is evolving toward a Secure Access Service Edge (SASE) future. By consolidating formerly disparate features like secure web gateway, cloud-delivered firewall, cloud access security broker, and DNS security into one cloud-based architecture, organizations can streamline their cybersecurity and improve their security resilience.

The Cyber-Security Service 208 also includes Telephonic Security Logic and circuitry 322 for establishing a secure audio call. When the call initiator 308 attempts to initiate a secure phone call with the call recipient 310, the call initiator 308 sends a call request 324 through the Cyber-Security Service 208. The Cyber-Security Service implements the Telephonic Security Logic 322 to initiate a secure audio call between the call initiator 308 and call recipient 310.

The Telephonic Security Logic accesses 326 the Authentication Service 210 to initiate authentication of the Call Initiator 308 and Call Recipient 310. The Authentication Service 210 performs a multifactor authentication 328 of the Call Initiator. The Authentication Service 210 can also send a notification 330 to the Call Recipient 310, to notify the Call Recipient 310 of the requested call. The Authentication Agent 210 can also perform a Multifactor Authentication 332 of the Call Recipient 310. The Multifactor Authentications 328, 332 of the Call Initiator 308 and Call Recipient 310 can include various authentication factors such as, but not limited to, answers to previously stored personal identification information, biometric data, push notifications and responses, etc.

In response to authenticating the identities of both the Call Initiator 308 and Call recipient 310, a secure call 334 is established between the Call Initiator 308 and Call Recipient 310. As previously described, one or more secure key tokens or other metadata can be embedded in the secure call channel.

Figure 4:
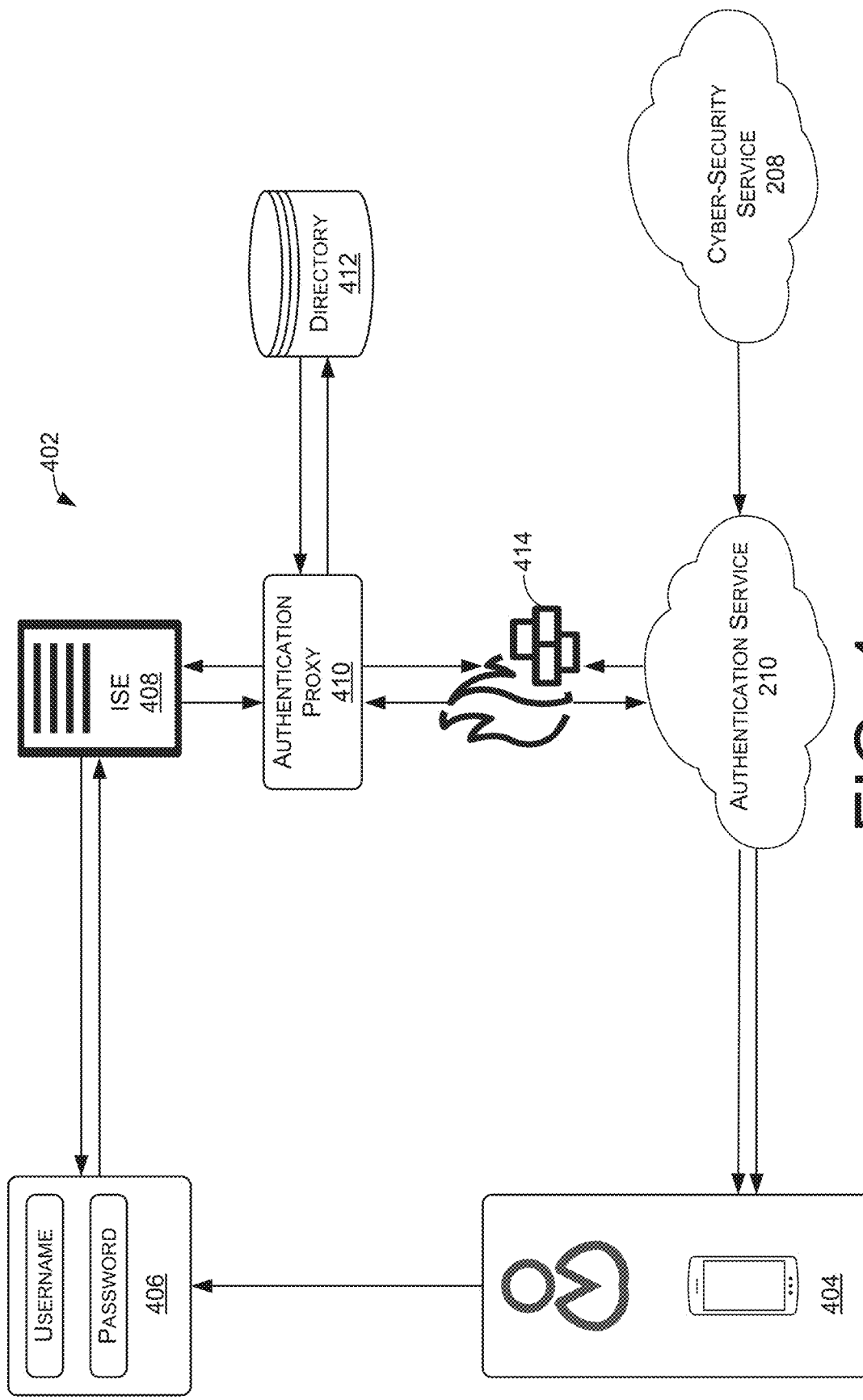
FIG. 4 illustrates schematic representation of a cloud-based authentication according to an embodiment which may be implemented to provide secure telephonic communication between a calling party and a receiving party.

FIG. 4 illustrates a schematic describing an environment 402 in which an Authentication Agent 210 according to an embodiment may be employed. FIG. 4 illustrates how the authentication agent 210 can be used to authenticate a user 404 for access to a device or secure call as described above. In one embodiment, the Cyber Security Service 208 can contact and activate the Authentication Service 210 to initiate an authentication of one or more users 404. The user 404 may be required to enter a username and password 406 to initially validate a previous registration of the user 404 with the authentication service 210. The user, by entering the username and password logs into an Identity Service Engine (ISE) device or service 408. An ISE is an identity and access control platform that enables enterprises to enforce compliance, enhance infrastructure security, and streamline service operations.

The ISE communicates with an Authentication Proxy service 410 which can store authentication data and policies in a database directory 412. The Authentication Proxy 410 can retrieve Authentication Data and policies from the Directory 412 and can interact with the Authentication Service 210 through a secure firewall 414. By using the authentication data and policies from the Authentication Proxy, the Authentication Service 210 can interact with the user 404 to authenticate the identity of the user 404. This multifactor authentication can include actions such as sending push notifications to the user 404 with randomly generated codes, requesting answers to previously stored identification questions (retrieved from the Directory 412), analyzing biometric data from the user 404, etc.

Figure 5:
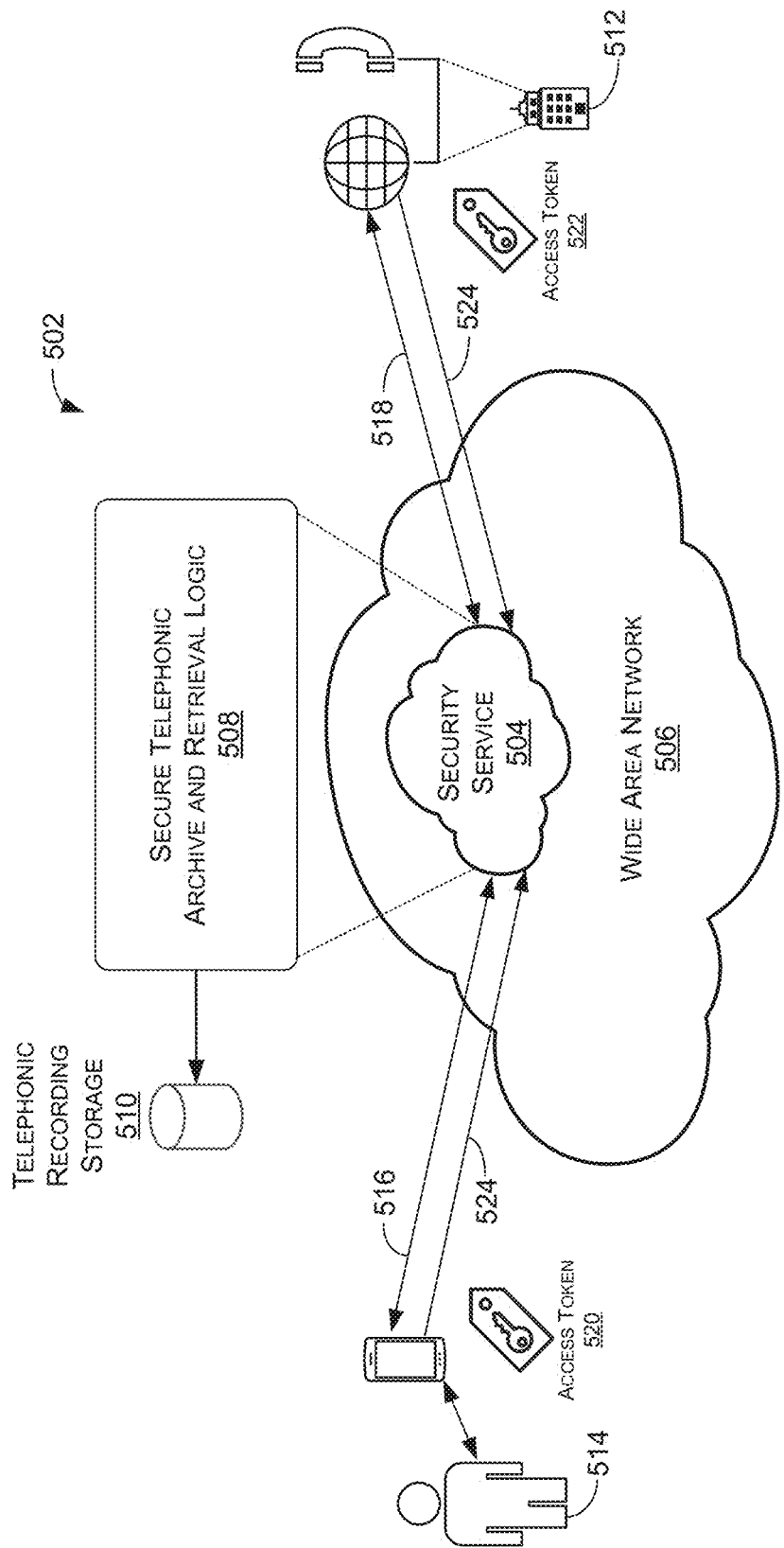
FIG. 5 illustrates schematic representation of a computer networking architecture which may be employed to provide secure archiving and retrieval of a telephonic communication between a calling party and a receiving party.

FIG. 5 illustrates a schematic representation of networked environment 502 according to an embodiment for providing secure archival and access to an audio call. The environment 502 includes a remote, cloud-based Security Service 504. The Security Service 504 can reside on one or more servers or other devices connected within a Wide Area Network such as the Internet 506.

The Security Service 504 can include Secure Telephonic Archive and Retrieval Logic 508. The Secure Telephonic Archival and Retrieval Logic 508 can record secure authenticated audio calls and store the recorded audio call in Telephonic Recording Storage 510. Telephonic Recording Storage can include a database that can be stored on computer readable media such as magnetic memory, solid state memory, Application Specific Integrated Circuitry (ASIC), on a secure server or other computer device.

When the Security Service 504 receives a request from a call initiator 512 to establish a secure audio call with a recipient 514, the Security Service 504 can perform a bi-directional multifactor authentication 516, 518 of both the call initiator 512 and the recipient 514. In response to successful authentication of the initiator 512 and recipient 514, the Security Service can establish a secure call between both parties as discussed above.

The Security Service 504 creates a unique Access Token or other metadata 520, 522 for each of the initiator and the recipient. After completion of or during the secure call, if either or both of the initiator 512 and recipient 514 sends a request 524 for access to the recorded, archived audio call, the Security Service 504 can use the Access 522 to determine whether to allow the initiator 512 or recipient 514 to gain access to the securely recorded and archived audio recording stored in the Telephonic Recording Storage 510.

In one embodiment, the Security Service 504 can use the authentication that was performed to generate the secure call to determine whether to supply the Access Token 520, 522 and whether to allow access to the audio recording. In another embodiment, the Security Service 504 can perform a fresh, new authentication of the requesting party to determine whether to allow access to the recording. The Security Service can use the Access Token 520 to ensure the integrity of the recorded call. This can function as a digital signature to ensure that the recorded audio call has not been altered or otherwise adulterated.

Figure 6:
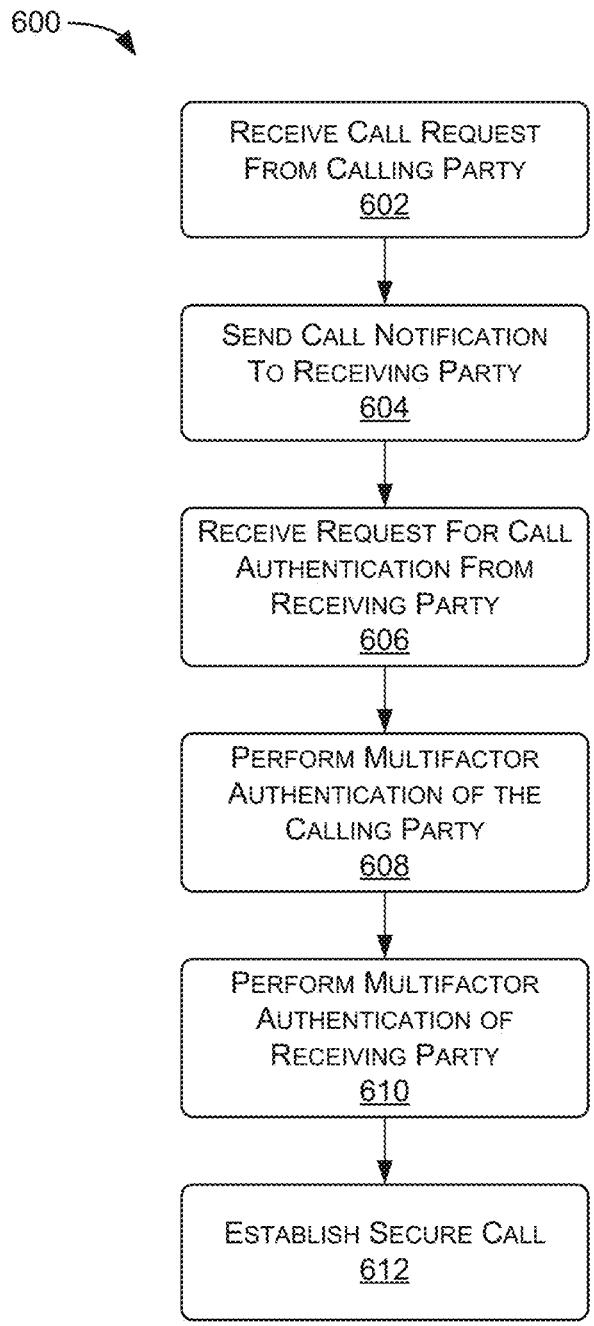
FIG. 6 illustrates a flow diagram for a method according to an embodiment for providing secure telephonic communication between a calling party and a receiving party.

FIG. 6 illustrates flow a flow diagram of an example method 600 that illustrates aspects of the functions performed at least partly by the devices in FIGS. 1-5. The logical operations described herein with respect to FIG. 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

With reference now to FIG. 6, a method 600 includes receiving a call request from a calling party 602. The calling party or call initiator can be associated with an enterprise such as a business, government entity military entity, etc. The calling party can be an entity that has registered with a security service that provides logic and support for performing authentication and establishing a secure call. The calling party can send the secure call request through a telecommunication network or company.

The call notification is sent to a receiving party 604. The receiving party is the intended recipient of the call from the calling party. In one embodiment, the receiving party can be an individual or entity that has previously registered with the security service to employ the security service to ensure secure calling. In one embodiment, the receiving party is notified of the call request and the receiving party can make a determination as to whether the receiving party wishes to authenticate the call and make the call secure.

A request for call authentication is received from the receiving party 606. In response to receiving the request for call authentication, a multifactor authentication of the calling party is performed 608. A multifactor authentication of the receiving party is also performed 610. The multifactor authentication of the calling and receiving party can include various authentication factors and techniques. For example, notifications can be pushed to the calling part and receiving party with randomly selected codes and a required responses. The authentication can also require either or both of the calling party and receiving party to answer previously stored personal identification questions. In addition, biometric data may be used to authenticate either or both of the calling and receiving parties.

In response to successfully authenticating both the calling and receiving party a secure call is established 612. In one embodiment, secure key tokens or other metadata can be embedded in a call channel to provide security of the call. A unique secure key token may be embedded for each of the calling party and receiving party. In one embodiment, a secure recording of the call can be archived. If either or both of the calling party and receiving party wishes to access the securely recorded, archived recording, multifactor authentication of the party requesting access to the recording can be performed before allowing access to the call recording.

Figure 7:
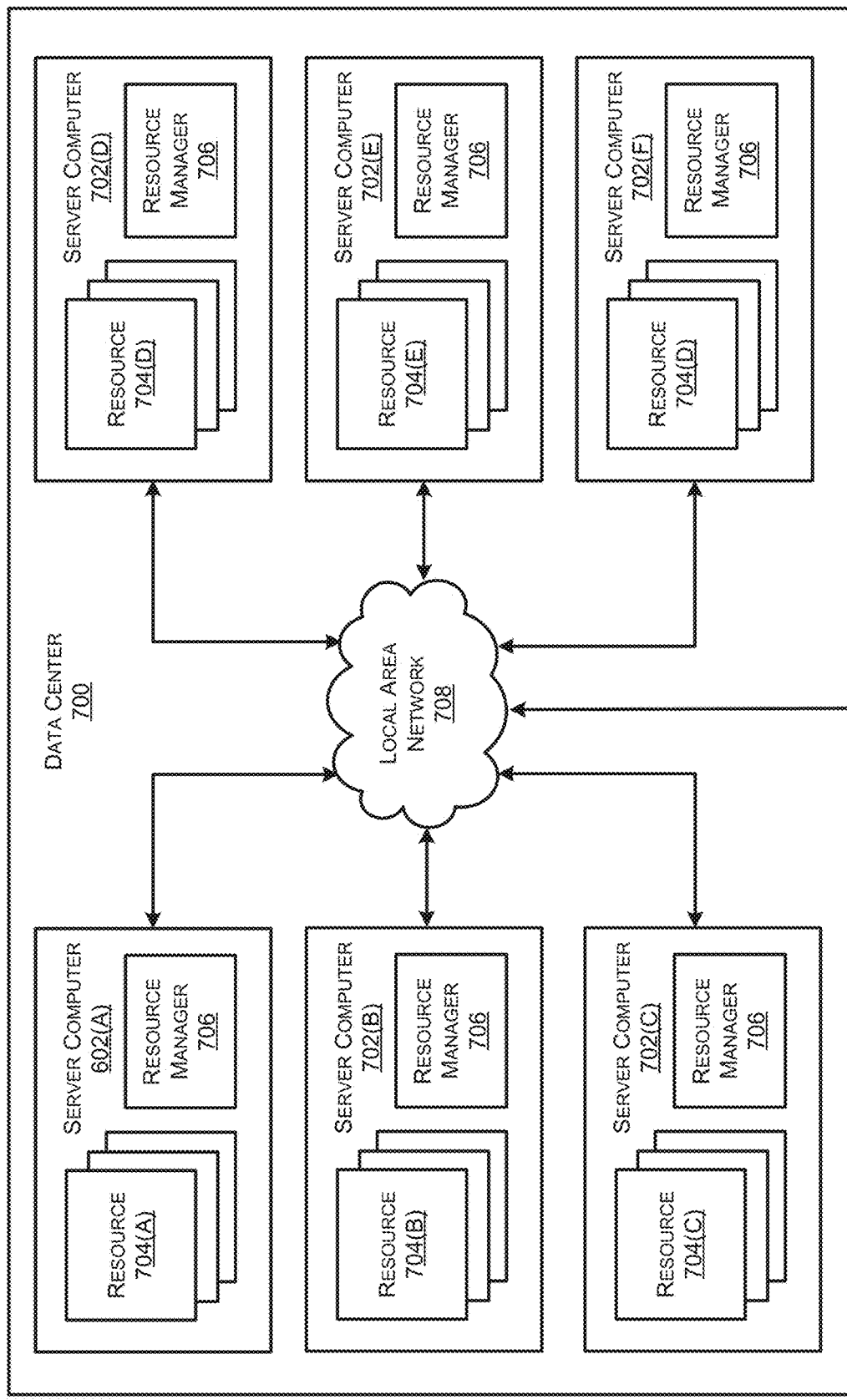
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 6 includes several server computers 702A-702F (which might be referred to herein singularly as "a server computer 702" or in the plural as "the server computers 702") for providing computing resources. In some examples, the resources and/or server computers 702 may include, or correspond to, the any type of networked device described herein. Although described as servers, the server computers 702 may comprise any type of networked device, such as servers, switches, routers, hubs, bridges, gateways, modems, repeaters, access points, etc.

The server computers 702 can be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 700 can also be configured to provide network services and other types of services.

In the example data center 700 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations can be utilized.

In some examples, the server computers 702 may each execute one or more application containers and/or virtual machines to perform techniques described herein.

In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 8.

Figure 8:
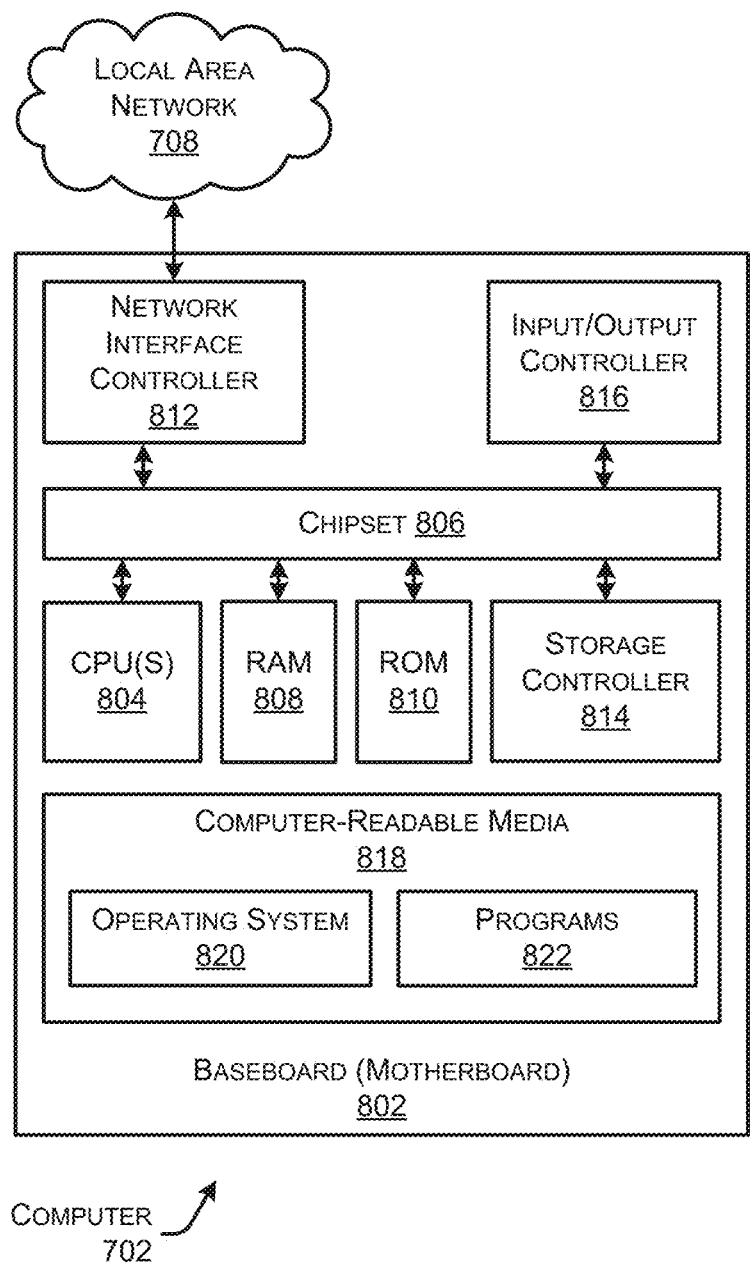
FIG. 8 is a computer architecture diagram showing an illustrative computer hardware architecture for implementing a computing device that can be utilized to implement aspects of the various technologies presented herein.

FIG. 8 shows an example computer architecture for a server computer 702 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. The server computer 702 may, in some examples, correspond to a physical server, and may comprise networked devices such as servers, switches, routers, hubs, bridges, gateways, modems, repeaters, access points, etc.

The computer 702 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 702. The chipset 806 can further provide an interface to a computer-readable storage medium such as a read-only memory ("ROM") 810 or non-volatile RAM ("NVRAM") for storing basic routines that help to startup the computer 702 and to transfer information between the various components and devices. The ROM 710 or NVRAM can also store other software components necessary for the operation of the computer 702 in accordance with the configurations described herein.

The computer 702 can operate in a networked environment using logical connections to remote computing devices and computer systems through a network, such as the network 708. The chipset 806 can include functionality for providing network connectivity through a NIC 812, such as a gigabit Ethernet adapter. The NIC 812 is capable of connecting the computer 702 to other computing devices over the network 708 (and/or 106). It should be appreciated that multiple NICs 812 can be present in the computer 702, connecting the computer to other types of networks and remote computer systems.

The computer 702 can be connected to a storage device 818 that provides non-volatile storage for the computer. The storage device 818 can store an operating system 820, programs 822, and data, which have been described in greater detail herein. The storage device 818 can be connected to the computer 702 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 702 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 702 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 702 can further read information from the storage device 818 by detecting the physical states or characteristics of one or more particular locations within the physical storage units.

In addition to the mass storage device 818 described above, the computer 702 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 702. In some examples, the operations performed by devices in a distributed application architecture, and or any components included therein, may be supported by one or more devices similar to computer 702. Stated otherwise, some or all of the operations performed by the systems 100, 400, and or any components included therein, may be performed by one or more computer devices 702 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 702. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 702.

In one embodiment, the storage device 818 or other computer-readable storage media is encoded with computer-executable instructions which, when loaded into the computer 702, transform the computer from a general-purpose computing system into a special-purpose computer capable of implementing the embodiments described herein. These computer-executable instructions transform the computer 702 by specifying how the CPUs 804 transition between states, as described above. According to one embodiment, the computer 702 has access to computer-readable storage media storing computer-executable instructions which, when executed by the computer 702, perform the various processes described above with regard to FIGS. 1-5B. The computer 702 can also include computer-readable storage media having instructions stored thereupon for performing any of the other computer-implemented operations described herein.

The computer 702 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 702 might not include all of the components shown in FIG. 8, can include other components that are not explicitly shown in FIG. 8, or might utilize an architecture completely different than that shown in FIG. 8.

As described herein, the computer 702 may comprise one or more of a router, load balancer and/or server. The computer 702 may include one or more hardware processors 804 (processors) configured to execute one or more stored instructions. The processor(s) 804 may comprise one or more cores. Further, the computer 702 may include one or more network interfaces configured to provide communications between the computer 702 and other devices, such as the communications described herein as being performed by the router, load balancer and/or server. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for providing a distributed application load-balancing architecture that is capable of supporting multipath transport protocol. That is, the computer 702 may comprise any one of the routers, load balancers, and/or servers. The programs 822 may comprise any type of program that cause the computer 702 to perform techniques for communicating with other devices using any type of protocol or standard usable for determining connectivity.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for secure audio communication between parties, the method comprising:
    receiving, at a network-based security service, a call request from a calling party;
    sending, at the network-based security service, a call notification to a receiving party;
    receiving, at the network-based security service, a request for call authentication from the receiving party;
    performing, by the network-based security service, a multifactor authentication of the calling party;
    performing, by the network-based security service, a multifactor authentication of the receiving party;
    establishing, by the network-based security service, a secure call between the calling party and the receiving party;
    assigning a first token key to the receiving party, the first token key being unique to the receiving party;
    embedding metadata in the secure call using the first token key and in a time series, wherein:
        individual instances of the metadata embedded in the secure call include respective time stamps indicating respective times at which respective call data was generated or received; and
        the individual instances of the metadata include the first token key that verifies that the respective times indicated by the respective time stamps at which the respective call data was generated or received are authentic.

2. The method as in claim 1, the method as in claim 1 further comprising:
    in response to authenticating the calling party via the multifactor authentication, assigning a second token key to the calling party, wherein
    the first token key is assigned to the receiving party in response to authenticating the receiving party via the multifactor authentication.

3. The method as in claim 1, wherein the method is performed by a third-party security service, and wherein the calling party and the receiving party are registered with the third-party security service.

4. The method as in claim 1, wherein the call request from the calling party includes an indication that a secure call is requested.

5. The method as in claim 1, wherein at least one of the multifactor authentication of the calling party and multifactor authentication of the receiving party includes biometric authentication.

6. The method as in claim 1, further comprising:
    storing a recording of the secure call;
    upon receiving a request for access to the recording from a requesting party, performing a multifactor factor authentication of the requesting party; and
    in response to authenticating the requesting party, allowing access to the recording of the secure call.

7. The method as in claim 6, wherein the requesting party is either of the calling party and the receiving party and the multifactor authentication is in addition to the multifactor authentication performed to establish the secure call.

8. A system for providing secure telephonic communication, the system comprising:
    one or more processors; and
    one or more non-transitory computer-readable media storing computer-executable instructions that, when executed by the one or more processors, cause the one or more processors to perform operations comprising:
        receiving a call request from a calling party;
        sending a call notification to a receiving party;
        receiving a request for call authentication from the receiving party;
        performing a multifactor authentication of the calling party;
        performing a multifactor authentication of the receiving party;
        establishing a secure call between the calling party and the receiving party;
        assigning a first token key to the receiving party, the first token key being unique to the receiving party;
        embedding metadata in the secure call using the first token key and in a time series, wherein:
            individual instances of the metadata embedded in the secure call include respective time stamps indicating respective times at which respective call data was generated or received; and
            the individual instances of the metadata include the first token key that verifies that the respective times indicated by the respective time stamps at which the respective call data was generated or received are authentic.

9. The system as in claim 8, operations further comprising:
    in response to authenticating the calling party via the multifactor authentication, assigning a second token key to the calling party, wherein
    the first token key is assigned to the receiving party in response to authenticating the receiving party via the multifactor authentication.

10. The system as in claim 8, wherein the operations are performed by a third-party security service, and wherein the calling party and the receiving party are registered with the third-party security service.

11. The system as in claim 8, wherein the call request from the calling party includes an indication that a secure call is requested.

12. The system as in claim 8, wherein at least one of the multifactor authentication of the calling party and multifactor authentication of the receiving party includes biometric authentication.

13. The system as in claim 8, the operations further comprising:
    storing a recording of the secure call;
    upon receiving a request for access to the recording from a requesting party, performing a multifactor factor authentication of the requesting party; and in response to authenticating the requesting party, allowing access to the recording of the secure call.

14. The system as in claim 13, wherein the requesting party either of the calling party and the receiving party and the multifactor authentication is in addition to the multifactor authentication performed to establish the secure call.

15. One or more non-transitory computer-readable media storing computer-executable instructions that, when executed by one or more processors, cause the one or more processors to perform operations comprising:
receiving a call request from a calling party;
sending a call notification to a receiving party;
receiving a request for call authentication from the receiving party;
performing a multifactor authentication of the calling party;
performing a multifactor authentication of the receiving party; and
establishing a secure call between the calling party and the receiving party;
assigning a first token key to the receiving party, the first token key being unique to the receiving party;
embedding metadata in the secure call using the first token key and in a time series, wherein:
individual instances of the metadata embedded in the secure call include respective time stamps indicating respective times at which respective call data was generated or received; and
the individual instances of the metadata include the first token key that verifies that the respective times indicated by the respective time stamps at which the respective call data was generated or received are authentic.

16. The one or more non-transitory computer-readable media as in claim 15, the operations further comprising:
in response to authenticating the calling party via the multifactor authentication, assigning a second token key to the calling party, wherein the first token key is assigned to the receiving party in response to authenticating the receiving party via the multifactor authentication.

17. The one or more non-transitory computer-readable media as in claim 15, wherein the operations are performed by a third-party security service, and wherein the calling party and the receiving party are registered with the third-party security service.

18. The one or more non-transitory computer-readable media as in claim 15, wherein the call request from the calling party includes an indication that a secure call is requested.

19. The one or more non-transitory computer-readable media as in claim 15 wherein at least one of the multifactor authentication of the calling party and multifactor authentication of the receiving party includes biometric authentication.

20. The one or more non-transitory computer-readable media as in claim 15, the operations further comprising:
storing a recording of the secure call;
upon receiving a request for access to the recording from a requesting party, performing a multifactor factor authentication of the requesting party; and
in response to authenticating the requesting party, allowing access to the recording of the secure call.

21. The method of claim 2, further comprising:
embedding second metadata in the secure call using the second token key and in a second time series, wherein:
individual instances of the second metadata embedded in the secure call include respective second time stamps indicating respective second times at which respective second call data was second generated by the calling party; and
the individual instances of the second metadata include the second token key that verifies that the respective second times indicated by the respective second time stamps at which the respective second call data was generated.

* * * * *